United States Patent Office 3,528,251
Patented Sept. 15, 1970

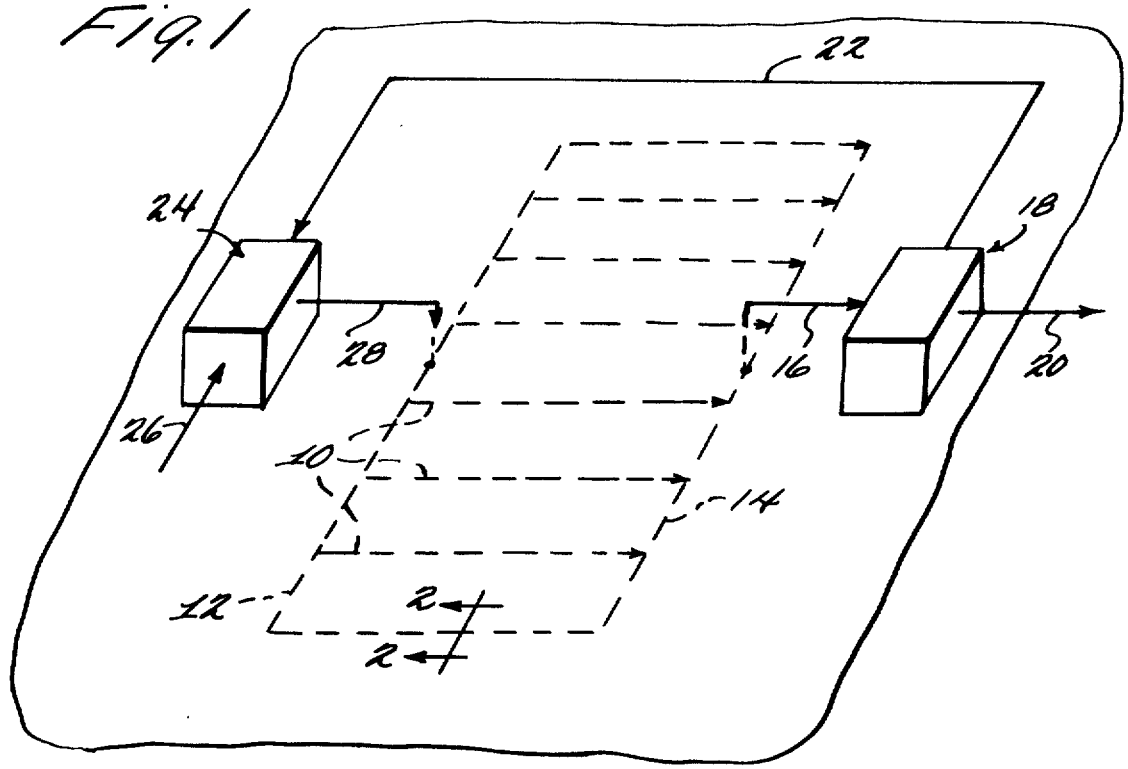
Fig. 1
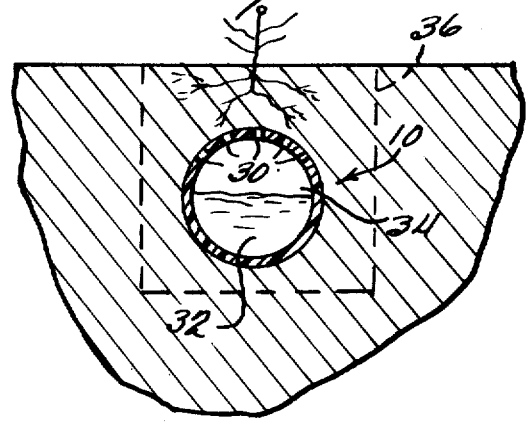
Fig. 2
Fig. 3
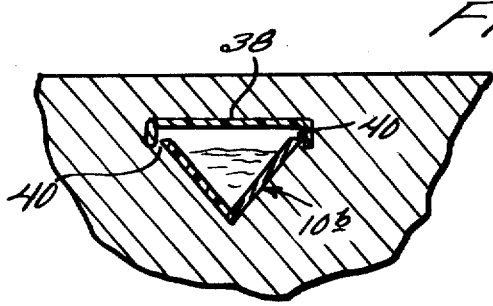
Fig. 4
INVENTOR
DAVID C. FALK

3,528,251
SALT WATER IRRIGATION SYSTEM
David C. Falk, 131 26th St., Newport News, Va. 23607
Filed Sept. 16, 1968, Ser. No. 760,005
Int. Cl. E02b 13/00
U.S. Cl. 61—13
9 Claims

ABSTRACT OF THE DISCLOSURE

An irrigation system for utilizing salt water comprises a plurality of subsurface, trough-like structures extending generally parallel to the surface of the ground at about the depth of the root system of the crop to be grown. The troughs are perforated above the level of the salt water therein to prevent soil from entering. Upon evaporation of part of the salt water by ground heat the resulting water vapor passes through the perforation into the soil.

---

The present invention relates to irrigation systems and in particular to a system which irrigates with salt water or other water which contains dissolved solids in a concentration which will not support plant growth if the water is applied directly to the soil.

It has been suggested in the past to utilize sea water or the like for growing plants by evaporating the sea water, condensing the resulting water vapor and applying the condensed fresh water to the growing plants or to the soil. Generally the suggestion has been to employ some type of solar still for the evaporation operation. As is well known, a solar still comprises an enclosure, usually constructed with at least one translucent wall which is penetrated by the sun's rays so as to impinge on and heat a body of water in the enclosure. The resulting water vapor is usually condensed on some convenient cooler surface within the enclosure.

The present invention contemplates irrigation with salt water or the like by means of a simple subsoil evaporation system which employs ground heat to evaporate water vapor directly into the soil adjacent the roots. This is accomplished, broadly, by providing a subsurface trough-like structure at a depth about equal to the root system of the crop to be grown and by providing a suitable barrier above the water surface which prevents entry of soil into the trough, which permits water vapor to move out of the trough into the adjacent soil and which prevents penetration of liquid water into the adjacent soil by capillary action. A suitable barrier is a perforated sheet or screen capable of supporting the soil overlying the trough and disposed above the water level in the latter so as to define a vapor space which is free of liquid water. Alternatively the trough may be a pipe having perforated walls above the level of the salt water. Since there is no direct contact between the liquid water and the soil, there is no tendency for the water to soak into and thereby poison the soil. A variety of trough constructions and barrier materials may be employed, it being necessary only to allow ready passage of water vapor out of the trough while preventing entry of soil into the trough and preventing loss of liquid water into the soil. In the interest of simplicity the word "trough" will be employed to designate any passageway which has bottom and side walls which are impervious to the passage of liquid water.

The water vapor which passes out of the trough permeates the soil around the roots of the plants and thereby provides moisture which can be absorbed by the roots. When the ground temperature drops at night, condensation of at least some of the water vapor will occur so that liquid water will be deposited directly in the soil.

It will be understood from the above broad description that the extent of evaporation of the salt water is largely dependent on the ground temperature. The invention therefore has its greatest utility in regions where high temperatures are experienced during the daytime for prolonged periods of time. Desert regions are particularly well suited, because the relatively low nighttime temperatures which usually occur are conducive to condensation of the water vapor in the soil.

Since the trough is disposed below ground and is not readily available for cleaning, care must be taken to avoid concentrating the salt water to the extent that solids will come out of solution and plug the trough. Generally, it will be desirable to pass the salt water through the trough in the form of a stream either continuously or intermittently and to discard all or part of the more concentrated brine which is formed while replenishing the incoming water with water of lower solid content. The concentration of the brine may be measured in any convenient way, as by measuring its specific gravity, and the concentration of the entering water may then be adjusted by varying the proportion of the recycled water and the replenishing water.

It will usually be desirable, also, to provide some form of liquid level control or overflow device to assure that the brine does not rise above the barrier and penetrate the soil. While an occasional spill would itself not be likely to poison the soil, continued spills and the capillary action of the soil particles would in time render the soil unfit.

While only one trough has been described above, it will be appreciated that for a large area a plurality of troughs will be employed, usually in parallel with each other. Of course, the principles of the invention apply to a simple wide trough as well, although a larger trough may introduce practical disadvantages of structural support and heat transfer into the water.

In the simplest trough arrangement evaporation takes place merely at the natural surface of the body of water. The rate of evaporation can be increased if desired by artificially increasing the surface area exposed to the vapor space in any of a variety of ways. It is known, for example that rotating discs dipping into a body of liquid will effectively increase the area of contact between the liquid and the surrounding vapor.

The invention will be further understood from the following detailed description of several exemplary embodiments taken with the drawing in which:

FIG. 1 is a schematic perspective view of an irrigation system which embodies the principles of the present invention;

FIG. 2 is a sectional view through one of the troughs of FIG. 1;

Referring to FIGS. 1 and 2 there is shown in simplified form an irrigation system which includes a plurality of subsurface troughs 10 each adapted to carry salt water and permit water vapor developed from the latter to permeate the soil, in accordance with the principles of the present invention. The troughs 10 extend parallel to each other under an area in which a crop (not shown) is to be grown and are connected at their ends to an inlet header 12 and an outlet header 14. The headers 12 and 14 may be imperforate pipes, or they may be troughs. A brine discharge pipe 16 extends upwardly from the discharge header 14 to an above-ground handling station 18 which is adapted to withdraw brine through the pipe 16, remove part of the brine through a removal pipe 20 and pass the remainder of the brine to a recycle pipe 22. Recycled brine is mixed in a handling station 24 with raw salt water which enters through a supply pipe 26, and the mixture is pumped into the inlet header 12 through a pipe 28. Suitable controls (not shown) are provided for maintaining a predetermined liquid level in the troughs 10, for maintaining flow through the troughs 10 and for maintaining the salt concentration in the water at a level below which crystallization will occur. These controls may form part of the handling stations 18 and 24 together with their pipes 16 and 28, or they may be separate therefrom. The details and location of the controls will vary with the complexity of the system. A simple system may merely flow the salt water once through the troughs 10, and in this even a simple weir arrangement might be employed at the outlet ends of the troughs 10.

A typical trough 10 is shown in FIG. 2 as consisting merely of a pipe, such as a plastic pipe, having a large number of perforations 30 in the wall thereof above the level of the stream ofsalt water 32, and forming a vapor space 34 above the salt water 32. The perforations 30 are sufficiently small to prevent soil from dropping through into the water 32 and are sufficient in number to permit ready passage of water vapor into the surrounding soil. The perforations 30 may be small holes or they may be narrow slots extending transversly of or longitudinally of the axis of the pipe.

The troughs 10 may be installed in any convenient manner, as by first digging a series of trenches 36 in the ground, laying the troughs 10 in the trenches and then filling in the trenches 36. The crop may then be planted in the usual manner. When the crop is a row crop, it will usually be desirable to plant the rows directly above and parallel to the troughs 10, as illustrated in FIG. 2. The depth of the troughs 10 below the surface of the ground should be such that the perforations 30 are close to the root system of the plants yet are not so close that the roots will enter and plug the perforations 30.

FIG. 3 illustrates a different form of trough 10a which consists of a longitudinal half-pipe and a screen 36 fitted over the top to prevent soil from entering and to form a vapor space above the salt water 32a. If necessary, a reinforcing grid (not shown) may be provided to support the screen 36 against collapse.

FIG. 4 illustrates another form of trough 10b in the form of a lower half-pipe section and an upper cap section 38 which extends laterally of the lower section to form a vapor slot 40 along each side of the lower section.

It will be apparent from the above that many different forms of trough construction may be employed, it being only necessary to provide a water impervious passageway for the salt water while providing a vapor space above the water in the passageway and means for passing the vapor into the surrounding soil without permitting passage of the salt water by capillary action.

What is claimed is:

1. A method for irrigating land with water which contains dissolved solids in a concentration which normally will not support plant growth comprising:

flowing a mass of said water into a subsurface passageway extending generally parallel to the surface at a depth about equal to the root system of the crop to be grown;

evaporating a portion of said water with ground heat to produce a fresh water vapor phase and a liquid water phase of sufficiently low dissolved solids content that the solids remain in solution;

passing the resulting water vapor into the soil adjacent said passageway;

preventing penetration of the unevaporated water into the surrounding soil by maintaining the unevaporated water out of contact with the soil thereby preventing migration of the liquid water through the soil particles by capillary action.

2. A method as in claim 1 including the step of forming said passageway by digging a cavity in the earth, installing said passageway in said cavity and replacing the earth.

3. A method as in claim 1 wherein said mass of water is moved into and through said passageway as a continuous stream.

4. A method as in claim 1 including removing at least a portion of the unevaporated water after evaporation has taken place and replenishing with water of lower dissolved solids content.

5. A method as in claim 1 including the steps of measuring the dissolved solids content of the unevaporated water and maintaining the solids content of the water in the passageway below that at which solids come out of solution by removing at least a portion of the unevaporated water from the passageway after evaporation and replenishing the passageway with water of lower dissolved solids content.

6. A method as in claim 5 wherein said unevaporated water is moved through said passageway as a continuous stream.

7. An irrigation system for utilizing water which contains dissolved solids in a concentration which normally will not support plant growth, said system comprising:

wall means defining a subsurface passageway extending generally parallel to the surface of the ground at a depth about equal to the root system of the crop to be grown, said wall means including water-impervious bottom and side retaining walls containing a body of the water which contains dissolved solids;

barrier means disposed above the water level in said passageway for excluding soil from said passageway and for passing water vapor from said passageway into the soil while preventing penetration of liquid water into the soil by capillary action whereby ground heat evaporates part of said water and whereby only water vapor passes into the soil;

and means for introducing said dissolved solids containing water into said passageway.

8. An irrigation system as in claim 7 wherein said barrier means includes a perforated structure disposed above the surface of the water and defining therewith a vapor space which is free of liquid water, said perforated structure supporting the soil directly above said passageway.

9. An irrigation system as in claim 8 including liquid level control means for maintaining the water level in said passageway below said perforated structure.

References Cited

UNITED STATES PATENTS

| 142,413 | 9/1873 | Pugh | 61—13 |
| 1,281,427 | 10/1918 | Steelquist | 61—12 |
| 2,067,356 | 1/1937 | Swinhoe | 61—13 |
| 2,807,912 | 10/1957 | Bjorksten | 61—12 X |

FOREIGN PATENTS

| 218,727 | 4/1957 | Australia. |

JACOB SHAPIRO, Primary Examiner

U.S. Cl. X.R.

47—48.5, 58; 202—82